(12) United States Patent
Drath et al.

(10) Patent No.: US 6,808,775 B2
(45) Date of Patent: Oct. 26, 2004

(54) CONFORMABLE, HEAT-RESISTANT, PAINTABLE ACRYLIC-BASED ADHESIVE TAPE AND METHOD OF APPLYING TO A SUBSTRATE

(75) Inventors: David J. Drath, Dexter, MI (US); Linda Hall, Jackson, MI (US); Dennis K. Fisher, Brooklyn, MI (US)

(73) Assignee: Adco Products, Inc., Michigan Center, MI (US)

(*) Notice: Subject to any disclaimer, the term of this patent is extended or adjusted under 35 U.S.C. 154(b) by 0 days.

(21) Appl. No.: 10/266,310

(22) Filed: Oct. 8, 2002

(65) Prior Publication Data

US 2003/0186012 A1 Oct. 2, 2003

Related U.S. Application Data

(60) Provisional application No. 60/367,548, filed on Mar. 26, 2002.

(51) Int. Cl.[7] .............................. B32B 9/00; C09J 9/00
(52) U.S. Cl. .................... 428/40.1; 428/41.5; 428/41.7; 428/343; 428/354; 428/355 AC
(58) Field of Search .............................. 428/40.1, 41.5, 428/41.7, 343, 354, 355 AC

(56) References Cited

U.S. PATENT DOCUMENTS

| | | | |
|---|---|---|---|
| 4,499,130 A | | 2/1985 | Questel et al. |
| 4,623,413 A | | 11/1986 | Questel et al. |
| 4,968,558 A | | 11/1990 | Fisher et al. |
| 5,183,833 A | | 2/1993 | Fisher et al. |
| 5,264,278 A | | 11/1993 | Mazurek et al. |
| 5,354,600 A | * | 10/1994 | Fisher et al. ................ 428/215 |
| 5,385,772 A | | 1/1995 | Slovinsky et al. |
| 5,527,595 A | | 6/1996 | Slovinsky et al. |
| 5,830,571 A | | 11/1998 | Mann et al. |
| 5,907,018 A | | 5/1999 | Mazurek et al. |
| 6,023,898 A | | 2/2000 | Josey |
| 6,048,806 A | | 4/2000 | Deeb et al. |
| 6,299,945 B1 | | 10/2001 | Mertz et al. |
| 6,365,254 B1 | | 4/2002 | Zoller et al. |

FOREIGN PATENT DOCUMENTS

| | | | |
|---|---|---|---|
| EP | 0 034 046 | * | 5/1981 |
| JP | 11029751 | | 2/1999 |

OTHER PUBLICATIONS

Yemm & Hart, Flexisurf (Plasticized PVC) Material Safety Data Sheet, reprinted on May 4, 2004 at http://www.yem-hart.com/materials/flexisurf/msds.htm.*

Adco Products Inc., Price Quotation dated Sep. 9, 1999 made to Venture Industries for acrylic tape with heat resistant release liner.*

Achilles USE Inc. Product Datasheet, Polyvinyl Chloride Film, reprinted Nov. 24, 2003.*

Acrylic Tape Keeps Tight Grip on Costs, Designfax, Jun. 1999, printed at http/www.manufacturingcenter.com/dfx/archives/0699/699just.asp.*

Price quotation dated Sep. 9, 1999 made to Venture Industries for acrylic tape with heat resistant release liner.

* cited by examiner

Primary Examiner—Harold Pyon
Assistant Examiner—Brian P. Egan
(74) Attorney, Agent, or Firm—Dinsmore & Shohl LLP

(57) ABSTRACT

A conformable, heat-resistant, paintable acrylic-based pressure sensitive adhesive tape and method for adhering the tape to a substrate is provided. The tape is comprised of a solid acrylic-based carrier including an acrylic-based adhesive on both sides of the carrier, and a conformable, heat-resistant liner adhered to at least one side of the adhesive. In use, the tape is adhered on at least one side to a substrate, painted, and then exposed to elevated temperatures such as those encountered in an automotive, appliance, or other commercial paint bake process. The conformable tape can withstand temperatures up to 300° F. and can be painted without degradation of the adhesive or liner and without a reduction of the adhesive properties of the tape.

5 Claims, 2 Drawing Sheets

CONFORMABLE, HEAT-RESISTANT, PAINTABLE ACRYLIC-BASED ADHESIVE TAPE AND METHOD OF APPLYING TO A SUBSTRATE

CROSS-REFERENCE TO RELATED APPLICATIONS

This application claims the benefit of U.S. Provisional Application Ser. No. 60/367,548, filed Mar. 26, 2002.

BACKGROUND OF THE INVENTION

The present invention relates to a conformable, heat-resistant, paintable acrylic-based adhesive tape. More particularly, the present invention relates to a two-sided acrylic-based adhesive tape having a conformable liner and a method of applying the tape to a substrate, where the tape can conform to the curves of the substrate and withstand environmental conditions encountered in automotive, appliance, and other commercial paint processes without degradation or a reduction in adhesive properties of the tape.

Acrylic pressure sensitive adhesive tapes are widely used in the automotive and appliance industry to bond a wide variety of substrate materials, and in particular, the application of painted exterior automotive body side moldings, sub-assemblies or trim parts. A common method of application is to use an acrylic attachment tape comprised of a foam core which adheres the substrate materials to the vehicle or appliance. However, a disadvantage of such foam core tapes is that they cannot withstand exposure to a paint bake cycle in which the part is painted and subsequently exposed to high temperatures in a paint oven to cure the painted part. For example, the foam core loses compressibility after the introduction of paint, thereby reducing the ability of the tape to sufficiently wet-out to the mating surface. In addition, the foam core may also break down as entrapped air in the foam expands at the elevated temperatures encountered in the bake cycle, rupturing the foam's cell structure, which also impedes wet-out and structural strength. Expanded gas can also collect at the tape-surface interface where it interferes with surface wet-out and bond strength.

In order to avoid the degradation of foam core acrylic tapes, the use of a separate masking tape has been employed which is applied to the part prior to the paint bake cycle in the area of the part which is to receive the foam core acrylic attachment tape to prevent that area from receiving paint. The masking tape is then removed after the paint bake cycle and the attachment tape is applied. However, the use of the masking tape adds additional steps and materials to the manufacturing process, which is both time-consuming and costly.

In order to avoid this extra step, the use of adhesive tapes which are heat-resistant have been developed. These adhesive tapes comprise a solid acrylic-based carrier and a heat resistant liner and can be attached to a substrate such as an automotive part and exposed to elevated temperatures without being subject to degradation. However, a disadvantage of such tapes is that they must be die cut for many applications in order to cover parts that are curved, such as wheel flares. The process of die cutting the tape to conform to shaped substrates requires the use of excess tape and adds additional steps to the manufacturing process which are time-consuming and costly.

Thus, there is a need in the art for an adhesive tape and liner construction which is capable of conforming to the substrate to which it is attached. There is also a need in the art for a tape and liner construction which is not adversely affected when exposed to paint, primers, and elevated temperatures such as those encountered in automotive, appliance, and other commercial painting processes.

SUMMARY OF THE INVENTION

The present invention meets that need by providing a conformable, heat-resistant tape including a solid core acrylic-based pressure sensitive adhesive and a heat-resistant liner adhered thereto. The liner is conformable and provides the tape with flexibility to conform to the shape of the substrate to which it is attached, remaining in intimate contact with the tape during paint processing. This eliminates the need to die cut the tape, thereby reducing the amount of tape needed for a particular application and the time and labor involved. The liner is also paintable and protects the tape from degradation resulting from exposure to paints and primers encountered during paint processing.

The conformable tape withstands temperatures up to about 300° F. (150° C.), and eliminates both the need for a separate masking and the need for die cutting when used in the application of paintable automotive part, appliance trim or subassembly parts, and other painted substrates.

According to one aspect of the present invention, a conformable, heat-resistant two-sided acrylic-based tape is provided comprising a solid acrylic-based carrier, a prepolymerized acrylic-based pressure sensitive adhesive on both sides of the carrier, and a conformable, heat-resistant liner adhered to at least one side of the adhesives on the carrier. By conformable, it is meant that the liner conforms to the surface of the substrate to which it is adhered without separating from the tape, and that it expands or contracts with the tape when exposed to the temperatures encountered in a paint bake cycle. To fulfill the requirements of conformability for the present invention, the tape construction must be able to conform to a minimum of a 2-inch radius for a 1-inch wide tape and a 1-inch radius for a 0.5 inch-wide tape.

By "solid" carrier, it is meant that the carrier has substantially no gaseous cells (however, the carrier may include microspheres). The carrier or core may be comprised of a single carrier or adhesive material, or a laminate comprising layers of similar or dissimilar carrier or adhesive materials. Thus, the solid carrier is not cellular and will not absorb paint, nor will any gases entrapped in the tape core result in expansion upon exposure to elevated temperatures.

The conformable, heat-resistant tape can withstand temperatures up to about 300° F. (150° C.) without degradation of the acrylic-based adhesive or liner, and without reducing the bonding properties of the acrylic-based adhesive. The conformable tape is also paintable. By paintable, it is meant that the conformable tape can withstand exposure to paints or primers used in a paint bake cycle without any adverse affects, i.e., without degradation of the acrylic-based adhesive or liner, and without reducing the bonding properties of the acrylic-based adhesive. By "paint bake cycle", it is meant a process in which the conformable tape is preferably adhered to a substrate such as an automotive, appliance, or other commercial part, primed, painted, and then passed through a paint bake oven which is used to cure the painted parts. The oven temperatures typically range from about 200° F. to 300° F. (80° C. to 150° C.) and cure times range from 25 minutes to 2 hours.

The conformable, heat-resistant tape preferably has a peel strength of at least 20 N/cm to the painted substrate after being processed through a paint bake cycle.

Preferably, the tape has a thickness of about 0.5 to 2.0 mm.

The conformable, heat resistant liner is preferably comprised of a polyvinyl chloride-based material. The liner maintains in intimate contact with the tape during paint processing, and expands or contracts with the tape during the process. The liner may be processed through a paint bake cycle without distortion or buckling and functions to protect the acrylic-based adhesive from exposure to solvents contained in paints or primers used during paint processing which could degrade the adhesive.

The conformable, heat-resistant tape of the present invention may be used in a variety of ways. The tape can be adhered to a substrate by adhering at least one side of the two-sided tape to at least one area of a substrate. The conformable, heat-resistant liner on the other side of the tape preferably faces outward. The substrate with the tape adhered thereon may then be painted and exposed to temperatures up to 300° F. (150° C.) to cure and dry the paint. Preferred substrate materials include wood, metal, glass, thermoplastic olefins, acrylonitrile-butadiene styrene, and polyvinyl chloride-based materials.

In use, the conformable heat resistant tape is preferably adhered to a substrate such as an automotive, appliance, or subassembly trim or part and then passed through a paint bake cycle such that the substrate is painted and/or exposed to heat curing or heat processing operations with the tape adhered to its surface. After the paint bake cycle, the conformable, heat-resistant liner may then be removed to expose the adhesive on the other side of the tape such that the painted part may be adhered to a second substrate such as the side of a vehicle or the body of an appliance.

It should be appreciated that the conformable, heat resistant tape of the present invention may also be used in applications where heat resistance is not required. Such applications include curved mutton bars for windows, curved sheet metal-works used in the HVAC industry, and curved assemblies used in the electronics industry.

Accordingly, it is a feature of the present invention to provide a conformable, heat-resistant, paintable acrylic-based adhesive tape including an acrylic-based adhesive and a conformable, heat resistant liner which may be adhered to a substrate and exposed to paint and elevated temperatures such as those encountered in a paint bake cycle without degradation of the tape or liner. Other features and advantages of the invention will be apparent from the following description, the accompanying drawings, and the appended claims.

DETAILED DESCRIPTION OF THE PREFERRED EMBODIMENTS

The conformable, heat-resistant acrylic-based pressure sensitive adhesive tape of the present invention provides a number of advantages over prior acrylic tapes currently used in producing painted automotive exterior trim products, appliance trim, or other commercial painted substrates where a pressure sensitive adhesive tape is used. Use of the conformable, heat-resistant pressure sensitive adhesive tape of the present invention eliminates the need for die cutting the tape in order to match the curvature of the substrate. Because the tape is paintable, there is no need for a separate masking tape because the tape can function as both the mask and the attachment tape. This results in a substantial labor and material savings due to the elimination of the steps of using expensive die cuts in tapes used to conform to the curved portions of the substrate, applying and removing a separate masking tape, and the elimination of costs associated with purchasing and maintaining carrier materials for the tape.

Figure 1:
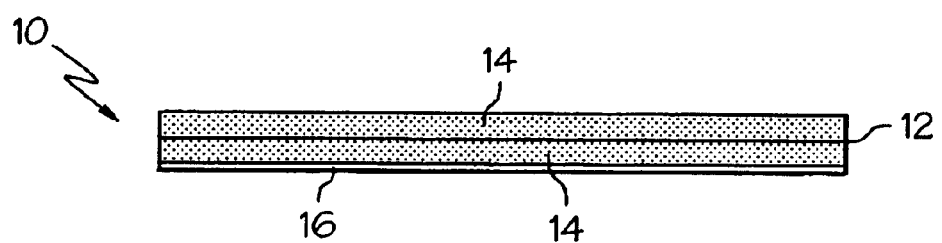
FIG. 1 is a perspective view of the conformable, heat-resistant tape of the present invention.

Referring now to FIG. 1, the conformable, heat-resistant acrylic-based adhesive tape 10 of the present invention is illustrated. The tape includes a conformable, heat-resistant liner 16 on at least one side of the tape. The liner may comprise any flexible, heat-resistant material which will conform to the substrate and remain in intimate contact with the tape during paint processing. The liner should not buckle or distort when exposed to elevated temperatures as encountered in a paint bake process. Buckling can be caused by loss of adhesion in the presence of heat or differentiated expansion of the liner and tape adhesive. In addition, the liner should be paintable, i.e., capable of protecting the acrylic-based adhesive from solvents contained in paints and primers used in the painting process which could adversely affect its adhesive properties. The conformable, heat-resistant liner is preferably comprised of a polyvinyl chloride-based material. A preferred liner for use in the present invention is available from Achilles USA under the designation Product No. GR088-T007E181. However, it should be appreciated that other polyvinyl chloride-based films may be used as well as other polymer films which possess the properties of conformability, heat resistance, and paintability.

The tape of the present invention may be provided in a number of forms, including strips which are slit to a desired length. Alternatively, the tape may be wound in continuous form or in a roll or on a spool. Where the tape is in the form of a roll, a second liner (not shown) may be provided on the other side of the tape for protection of the adhesive surface of the tape during shipment and storage prior to use.

The liner preferably has a thickness of about 0.002 inches to about 0.012 inches (0.05 to 0.30 mm). The tape may range in thickness from about 0.5 to about 2.0 mm and may be provided in widths ranging from about 4 mm to about 1700 mm.

The tape further includes a solid carrier 12 with an acrylic-based pressure sensitive adhesive 14 on both sides of the carrier. While the tape is described herein as being two-sided, it should also be appreciated that the tape may be provided with an adhesive on only one side of the carrier.

The acrylic-based pressure sensitive adhesive 14 is preferably formulated from a combination of non-tertiary acrylic acid esters of alkyl alcohols and ethylenically unsaturated monomer(s) having at least one polar group. The adhesive is preferably comprised of non-tertiary acrylic acid alkyl esters formed from alcohols having from about 4 to about 12 carbon atoms, and preferably from about 6 to 10 carbon atoms, particularly the non-tertiary acrylic acid alkyl ester, 2-ethylhexyl acrylate. Specific examples of suitable adhesive formulations are disclosed in U.S. Pat. No. 5,354,600, the disclosure of which is incorporated herein by reference.

Crosslinking agents such as di- and triacrylates, may also be included in the adhesive formulation, generally in amounts of from about 0.005 to about 0.5 weight percent, based on total weight of polymer in the adhesive formulation, and more preferably, from about 0.01 to about 0.2 weight percent. Suitable crosslinking agents may also be present such as 1,6 hexane diol diacrylate. Other crosslinking agents including commercially available organofunctional silanes may also be utilized.

The adhesive is preferably formed by at least partially photopolymerizing the formulation by exposure to UV radiation as described in commonly-assigned U.S. Pat. No. 5,183,833, the disclosure of which is hereby incorporated by reference.

A preferred acrylic-based adhesive formulation for use in the present invention includes from about 60–90% by weight 2-ethylhexyl acrylate, 1–20% by weight acrylic acid, about 2% by weight of an initiator, about 2% of a compatible crosslinking agent such as hexane diol diacrylate, about 5% by weight silica, and from about 5–20% by weight polyvinyl acetate. This monomeric formulation is preferably cured to at least 95% by weight solids.

While the present invention is directed to the use of acrylic-based adhesives, it should be appreciated that other types of pressure sensitive adhesives may be used as long as they do not have a structure which will degrade with heat as encountered in a paint bake process as described herein. Examples of other suitable pressure sensitive adhesives include butyl-, urethane-, or silicone-based adhesives.

In a preferred embodiment, the acrylic-based carrier for the tape comprises a pressure sensitive adhesive matrix formed from a crosslinked polymer which may include acrylic acid esters of primary or secondary alcohols. The adhesive matrix preferably includes a filler comprising dispersed organic particulate solids which are compatible with the matrix. The carrier may be formed by extruding a combination of the polymer and filler as described in commonly-assigned U.S. Pat. No. 5,385,772, the disclosure of which is hereby incorporated by reference. The carrier may be comprised of a single material, or a laminate comprised of several layers of dissimilar materials.

By using a solid carrier, the tape will not absorb paint in a paint bake cycle as would occur with the use of prior foam core tapes. Additionally, there is no cellular structure to entrap air that would expand and degrade the tape with the introduction of elevated temperatures such as those encountered in automotive, appliance, or other commercial paint bake or annealing processes.

Figure 2:
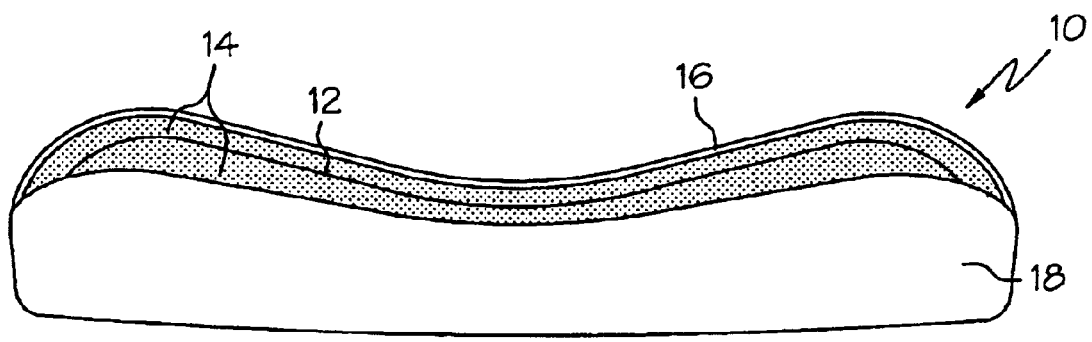
FIG. 2 is a perspective view of the tape adhered and conformed to a substrate.

As shown in FIG. 2, the conformable, heat-resistant tape is preferably adhered to and conforming with a substrate 18 such as an automotive or appliance part. The substrate surface should be clean (i.e., free of oils and other contaminants) to allow proper adhesion. Depending on the type of substrate, an adhesion promoter or primer may be applied to the substrate surface prior to application of the tape.

The conformable tape is adhered to the substrate such that the liner 16 faces outward. The liner is flexible so as to match the topology of the substrate, thus it curves and conforms to the substrate. While the tape is illustrated on only one area of the substrate, it should be appreciated that multiple pieces of tape may be applied to different areas of the substrate. Alternatively, the tape may be substantially coextensive with the surface of the substrate. The tapes may also comprise different sizes or shapes as needed, for example, in use with die-cut parts and extruded profiles.

Figure 3:
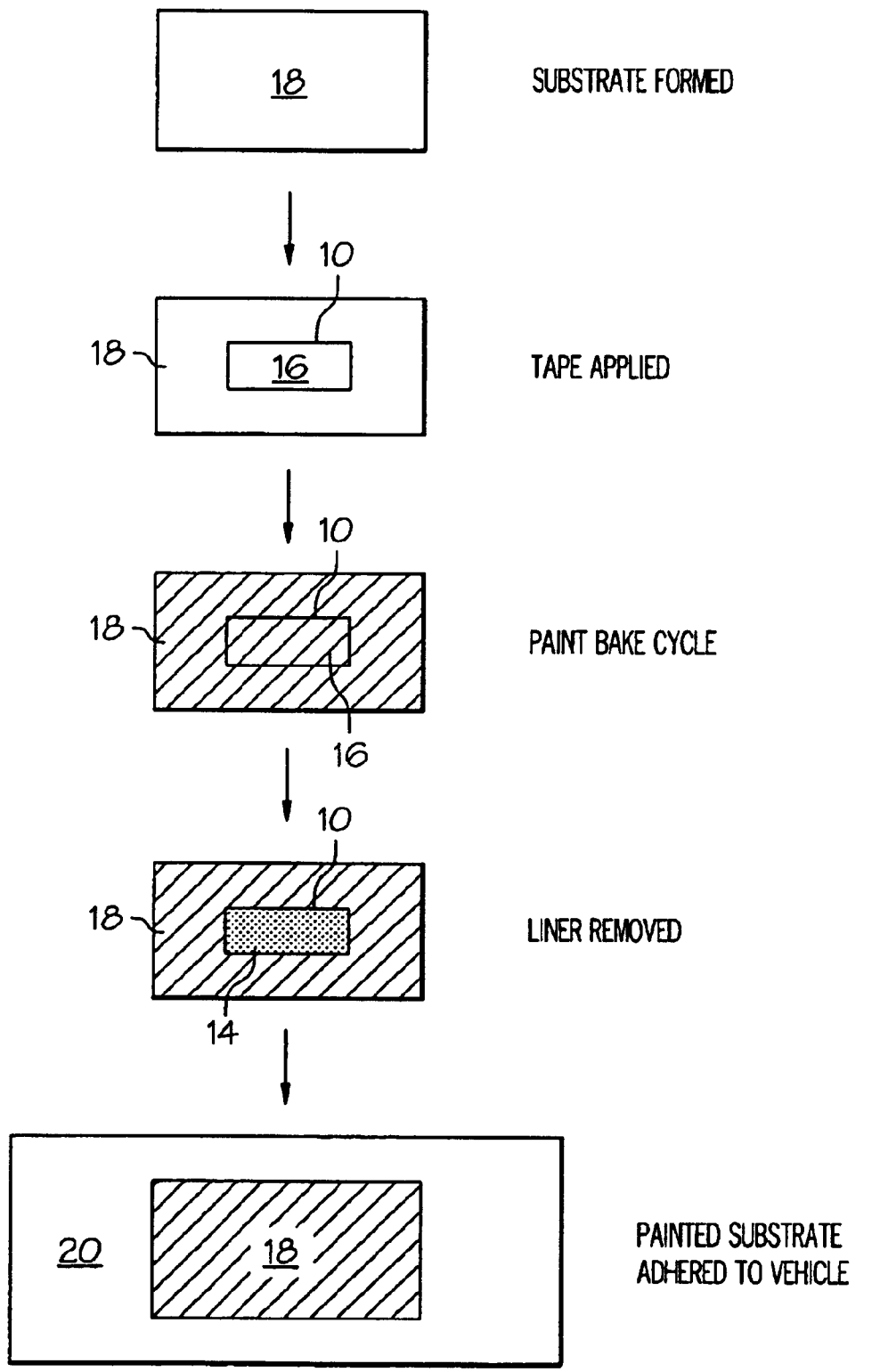
FIG. 3 is a flow diagram illustrating the method of applying the tape to a substrate and passing the substrate through a paint bake cycle.

FIG. 3 illustrates a preferred embodiment of the invention in which the tape is applied to a substrate such as an automotive or appliance part and then processed through a paint bake cycle. As shown, a substrate 18 is provided which may be in the form of a molded automotive part. The tape may be adhered to a wide variety of substrates including, but not limited to, wood, glass, metal, thermoplastic olefins, acrylonitrile butadiene styrene, polyvinyl chloride-based materials, reaction injection molded parts, and clear coated parts. In automotive applications, the substrates may be in the form of exterior trim including body side molding, wheel well flares, reveal moldings, roof ditches, and other paintable parts. In appliance applications, the substrates may be in the form of metal trim, casements, or other paintable parts. The tape may also be used in windows assembly applications where the substrates are in the form of wood, metal or plastic mullions.

After application of the tape 10 to the substrate, the substrate 18 with the tape on its surface is then processed through a paint bake cycle as shown. The paint bake cycle typically lasts for about 30 minutes at a temperature of about 250° F. (120° C.). The substrate may optionally be coated with a primer prior to painting.

After the substrate with the tape 10 has been passed through the paint bake cycle, the liner 16 may then be removed, and the painted substrate may be adhered by adhesive 14 to the final substrate in the desired application, such as to an automotive vehicle body 20 as shown.

It will be apparent to those skilled in the art that various changes may be made without departing from the scope of the invention which is not considered limited to what is described in the specification.

What is claimed is:

1. A conformable, heat resistant two-sided acrylic-based tape comprising:
   a solid acrylic-based carrier;
   a prepolymerized acrylic-based adhesive on both sides of said carrier; and
   a conformable heat resistant removable liner comprised of a polyvinyl-chloride based material adhered to at least one side of said adhesives on said carrier; wherein said adhesive and liner withstand temperatures of 300° F.

2. The tape of claim 1 having a thickness of about 0.5 to 2.0 mm.

3. The tape of claim 1 wherein said tape is paintable.

4. The tape of claim 1 having a peel strength of at least 20 N/cm.

5. In combination, a conformable, heat resistant two-sided acrylic-based tape and a substrate comprising:
   a solid acrylic-based carrier;
   a prepolymerized acrylic-based adhesive on both sides of said carrier; and
   a conformable heat-resistant liner comprised of a polyvinyl-chloride based material adhered to one side of said adhesive coated carrier; wherein the adhesive on the other side of said carrier is adhered to said substrate; and wherein the adhesive and liner on said substrate are paintable and withstand temperatures of 300° F.

\* \* \* \* \*